United States Patent
Stawikowski

(10) Patent No.: US 9,628,578 B2
(45) Date of Patent: Apr. 18, 2017

(54) SYSTEM AND METHOD FOR SHARING DATA STORED IN A DATABASE

(75) Inventor: Jean-Marie Stawikowski, Le Cannet (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 495 days.

(21) Appl. No.: 14/123,134

(22) PCT Filed: Jun. 6, 2012

(86) PCT No.: PCT/EP2012/060737
§ 371 (c)(1),
(2), (4) Date: Nov. 29, 2013

(87) PCT Pub. No.: WO2012/168319
PCT Pub. Date: Dec. 13, 2012

(65) Prior Publication Data
US 2014/0108515 A1    Apr. 17, 2014

(30) Foreign Application Priority Data
Jun. 8, 2011    (FR) ..................... 11 55002

(51) Int. Cl.
*G06F 15/16* (2006.01)
*H04L 29/08* (2006.01)

(52) U.S. Cl.
CPC ........ *H04L 67/2804* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 2006/0117073 A1* | 6/2006 | Bosworth | G06F 17/30575 |
| 2009/0193050 A1* | 7/2009 | Olson | G06F 17/30292 |
| 2011/0016448 A1* | 1/2011 | Bauder | G06F 8/20 717/104 |

(Continued)

OTHER PUBLICATIONS

David Chappell, Introducing ODATA, Data Access for the Web, The Cloud, Mobile Devices, and More, May 2011, Microsoft Corporation, pp. 1-24.*

(Continued)

*Primary Examiner* — Esther B Henderson
(74) *Attorney, Agent, or Firm* — Oblon, McClelland, Maier & Neustadt, L.L.P.

(57) ABSTRACT

A computer system for sharing data in a database, including the database, an Internet network, and a client computer device communicating with a software interface of the database through the network via Open Data Protocol. The software interface sends metadata describing a data model of the database to the client computer device, and the client device makes a software graphic interface by associating the metadata with a graphic interface component graphically displaying the stored data. The computer system further includes electrical equipment that communicates with the software interface through the network via the Open Data Protocol, and one item of following equipment: a programmable logic controller, and input/output module, a speed controller, a switch, a sensor, an actuator, a measurement apparatus.

10 Claims, 1 Drawing Sheet

(56) References Cited

U.S. PATENT DOCUMENTS

2011/0088039 A1 4/2011 Tabone et al.

OTHER PUBLICATIONS

French Preliminary Search Report issued Feb. 21, 2012, in French Patent Application No. 1155002 with English translation of category.
Chen., L., et al., "Design and Implementation of Web-Based Distributed Control System", IEEE Canadian Conferences on Electrical & Computer Engineering, pp. 681-686, (May 12, 2002) XP 010707462.
"ODATA: URI Conventions", URL: http://web.archive.org/web/20110425090409/http://www.odata.org/developers/protocols/uri-conventions, pp. 1-10, (Apr. 25, 2011) XP 002680602.
International Search Report Issued Aug. 8, 2012 in PCT/EP12/060737 Filed Jun. 6, 2012.

\* cited by examiner

SYSTEM AND METHOD FOR SHARING DATA STORED IN A DATABASE

TECHNICAL DOMAIN

The invention relates to sharing of data in a computer system comprising at least one network, one database, and one client device that will graphically display data stored in the database, regardless of which data model is used by the database.

The invention will advantageously be used for making an electrical energy management system hosted on Internet, so that customers can remotely control and/or manage electricity consumption and/or the operation of one or several electrical items or equipment.

STATE OF PRIOR ART

Computer applications for remote management and control of equipment are considered more and more frequently, due to Internet. Such applications are implemented on client devices, for example such as personal computers or smartphones, used as control and management terminals by users of these applications.

Graphic interfaces enable users to exchange data (commands, data such as electricity consumption, etc.) between remote equipment such as automation equipment and client devices. Databases can be used as interfaces between client devices and remotely managed equipment.

At the same time, the "Cloud computing" concept is becoming more and more widespread. This concept consists of transferring computer processing traditionally located on local servers or directly on users' client devices, onto remote servers. Databases for computer applications for remote management and control of equipment considered above are hosted in "Cloud computing".

However, the use of remote computer processing creates problems related to sharing and exchanges of data between client devices and remote equipment through databases, particularly taking account of the many types of data models that can be used in databases. Each database comprises a data model corresponding to the logical organisation of the data stored in it. A data model is a model that abstractly describes how data are represented in the database. Thus, client applications may for example encounter difficulties in correctly displaying data stored in databases due to incompatibilities between the data model of the queried database and the graphic interface of the client computer application.

PRESENTATION OF THE INVENTION

One purpose of this invention is to disclose a new data sharing computer system without the disadvantages of prior art, in other words capable of sharing data between at least one database and at least one client device regardless of the data model used in the database, and particularly enabling correct graphic or visual display of data stored in the database, regardless of the data model used in the database.

To achieve this, this invention discloses a computer system for sharing data to be stored in at least one database, comprising the database, a telephone and/or computer network and at least one client computer device that will communicate with a software interface of the database through the telephone and/or computer network, in which the software interface of the database comprises means capable of sending metadata describing a data model of the database to the client computer device, for example after having received a request sent by the client computer device to send metadata, and in which the client computer device comprises means capable of making a software graphic interface by associating the received metadata with at least one graphic interface component that will graphically display at least part of the data that will be stored in the database, in which:

the software interface of the database and the client computer device comprise means of sending and receiving data based on the Open Data Protocol;
at least part of the telephone and/or computer network is the Internet network;
and also comprising at least one item of electrical equipment that will communicate with the database software interface through the telephone and/or computer network, comprising means of sending and receiving said data to be stored in the database, based on the Open Data Protocol, said electrical equipment comprising at least one of the following items of equipment: a programmable logic controller, an input/output module, a speed controller, a switch, a sensor, an actuator, a measurement apparatus.

A data sharing computer system is also disclosed for data to be stored in at least one database, comprising the database and at least one client computer device that will communicate with the software interface of the database through a telephone and/or computer network, in which the database software interface comprises means capable of sending metadata describing a data model of the database to the client computer device, and in which the client computer device comprises means capable of making a software graphic interface by associating received metadata with at least one graphic interface component that will graphically display at least part of the data that will be stored in the database.

Therefore, the computer system according to the invention makes it possible to dynamically construct software graphic interfaces (for example of the gateway type) from the data model(s), in other words schemes of the database(s) consulted by the client computer devices. Therefore, the computer system according to the invention is fully compatible with the various existing databases, regardless of the data model in the consulted database.

The computer system according to the invention achieves this by using metadata of the base from which one or several graphic interface components are constructed dynamically. The result thus obtained is a software graphic interface on the client device, adapted to the data model of the database queried by the client computer device, and therefore adapted to data that will be displayed by the client computer device.

Unlike previous approaches based on Web Services (SOAP and WSDL), the system according to the invention is "Data" oriented, such that it is better adapted to operate with databases than previous "object" oriented approaches based on Web Services.

The database software interface and the client computer device may comprise means of sending and receiving data, based on the Open Data Protocol. In particular, one advantage of such a protocol is that it is a web protocol capable of retrieving metadata from queried databases, on request.

The client computer device may comprise means of sending and receiving said data to be stored in the database. Thus, apart from recovery of metadata and dynamic construction of a software interface from these metadata, the client computer device may for example send queries to the database through its software interface, these queries for example being used to retrieve data stored in the database and designed to be displayed using the graphic interface of the client device, that was previously constructed dynamically from the received metadata. It is also possible to send data to be stored in the database, from the client device.

The computer system may also comprise at least one item of electrical and/or computer management equipment, that will communicate with the database software interface through the telephone and/or computer network, and that comprises means of sending and receiving said data to be stored in the database. Data stored in the database can thus be updated by sending data from the equipment to the database. The equipment may also retrieve data, for example commands, stored in the database and sent from the client computer device.

The electrical and/or computer management equipment may comprise means of sending and receiving data based on the Open Data Protocol.

The client computer device may be a computer or an electronic tablet or a smartphone, and/or in which, when the computer system comprises an electrical equipment, said electrical equipment may comprise a programmable logic controller and/or an input/output module, and/or a speed controller, and/or a switch, and/or a sensor, and/or an actuator, and/or a measurement apparatus.

At least part of the telephone and/or computer network may be the Internet network. The telephone and/or computer network may also comprise one or several Intranet networks coupled to the Internet network.

The invention also relates to a method for sharing data to be stored in at least one database, comprising at least production of a software graphic interface in a client computer device that will communicate with a software interface of the database through a telephone and/or computer network, comprising at least the following steps:
    send a request to send metadata describing a data model of the database, from the client computer device to the software interface of the database; then
    send said metadata from the database software interface to the client computer device; then
    associate said metadata received by the client computer device with at least one graphic interface component that will graphically display at least part of the data to be stored in the database;
    in which the database software interface and the client computer device communicate with each other using the Open Data Protocol, and at least part of the telephone and/or computer network is the Internet network;
    and also comprising at least one step to transmit data from at least one item of electrical equipment to the database software interface through the telephone and/or computer network, said data sent from the electrical equipment being stored in the database, the database software interface and the electrical equipment communicating with each other using the Open Data Protocol, the electrical equipment comprising at least one of the following items of equipment: a programmable logic controller, an input/output module, a speed controller, a switch, a sensor, an actuator, a measurement apparatus.

A method is also disclosed for sharing data to be stored in at least one database, comprising at least the production of a software graphic interface in a client computer device that will communicate with a software interface of the database through a telephone and/or computer network, comprising at least the following steps:
    send a request to send metadata describing a data model of the database, from the client computer device to the software interface of the database; then
    send said metadata from the database software interface to the client computer device; then
    associate said metadata received by the client computer device with at least one graphic interface component that will graphically display at least part of the data to be stored in the database.

The database software interface and the client computer device may communicate with each other using the Open Data Protocol.

The method may also comprise the following steps after making the software graphic interface:
    send a request to send at least part of said data stored in the database from the client computer device to the database software interface; then,
    send said data stored in the database, from the database software interface to the client computer device; then
    update the graphic interface component using said data received by the client computer device.

Thus, data stored in the database are graphically displayed through the previously dynamically constructed software interface.

The method may also comprise at least one step to send data from at least one electrical and/or computer management equipment to the database software interface through the telephone and/or computer network, said data sent from the electrical and/or computer management equipment being stored in the database. Data stored in the database may thus be updated by sending data from the equipment to the database.

The step in which data are sent from the electrical and/or computer management equipment to the database software interface may be repeated regularly and/or done during a state change of the electrical equipment and/or the computer management equipment. Updates to data stored in the database are thus regularly performed.

The method may also comprise the following steps:
    send control data from the client computer device to the database software interface; then
    store said control data in the database; then
    send a request to send control data stored in the database from the electrical and/or computer management equipment to the database software interface; then
    send control data stored in the database from the database software interface to the electrical equipment and/or the computer management equipment.

The equipment can thus retrieve data, for example commands, stored in the database and sent from the client computer device.

The database software interface and the electrical and/or computer management equipment may communicate with each other using the Open Data Protocol.

BRIEF DESCRIPTION OF THE DRAWINGS

This invention will be better understood after reading the description of example embodiments given purely for information and in no way limitative with reference to the appended drawings on which.

Identical, similar or equivalent parts of the various figures described below have the same numeric references to facilitate comparisons between the different figures.

The various parts shown on the figures are not necessarily all shown at the same scale, to make the figures more easily understandable.

The various possibilities (variants and embodiments) must be understood as not being mutually exclusive and they may be combined together.

DETAILED PRESENTATION OF PARTICULAR EMBODIMENTS

Figure 1:
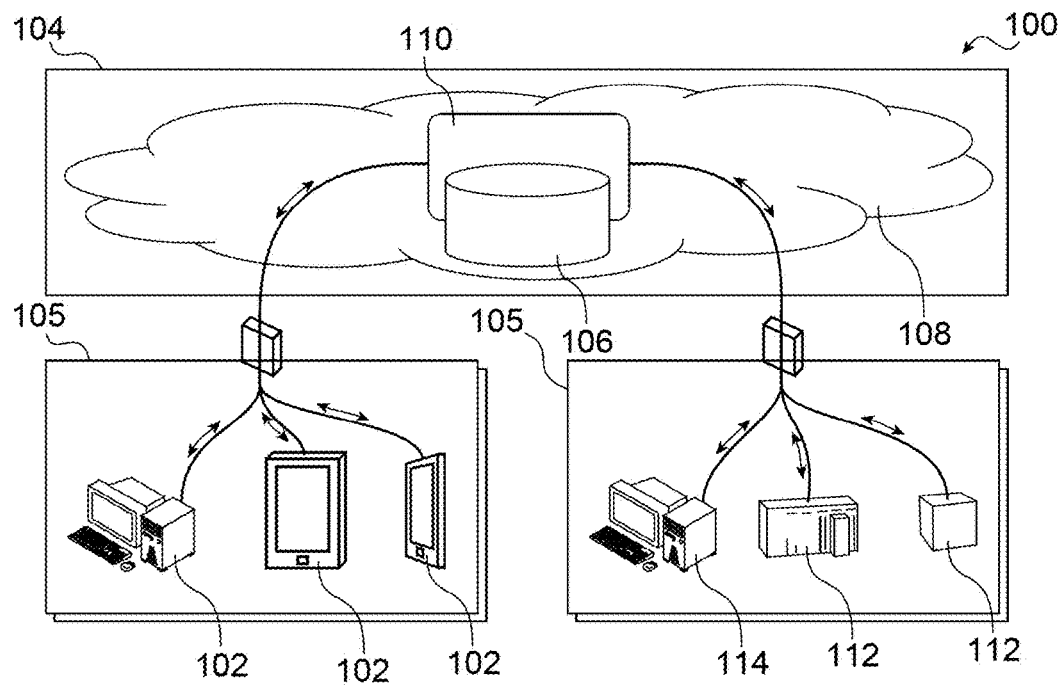
FIG. 1 diagrammatically shows a data sharing computer system according to a particular embodiment of this invention.

Refer firstly to FIG. 1 that diagrammatically shows a data sharing computer system 100 according to one particular embodiment. In this embodiment, the computer system 100 corresponds to an electrical energy management system hosted on Internet, for example that can be used by customers to remotely control and/or manage electricity consumption of one or several items of electrical equipment 112 and/or one or several items of computer management equipment 114, for example capable of managing several items of electrical equipment at the same time, from client computer devices 102.

The system 100 comprises one or several client computer devices 102 such as computers, tablets or smartphones, or any other electronic and/or computer device comprising means capable of communicating and exchanging electronic data on a computer network 104 such as the Internet network. The network used will depend on the type of client device 102 and therefore may for example use a land or mobile telephone network.

Client devices 102 are for example connected to the Internet network 104 through one or several Intranet type mobile or WiFi telephone networks 105 connected to the Internet network 104 and to which the client devices 102 are connected.

The client devices 102 are intended to exchange computer data with one or several databases 106 (or with one or several servers comprising these databases 106) that are for example hosted on Cloud computing 108. Data are exchanged between the database 106 and client devices 102 through a Web protocol for a data exchange through the HTTP protocol that is the protocol used by Internet, and particularly allowing access to metadata of the database 106 through Internet. Such a Web protocol for example corresponds to the "Open Data Protocol", also called OData. OData is a protocol for sharing data based on Atom, JSON and APP (Atom Publishing Protocol) standards for sharing data through the HTTP standard with different types of client devices.

Computer applications installed on client devices are capable of sending and receiving data through this OData web protocol. Furthermore, the database 106 comprises a software interface 110 that makes it capable of communicating with client devices 102 through this OData web protocol.

The system 100 also comprises one or several items of electrical equipment 112 and/or one or several items of computer remote management equipment 114, for example of the SCADA ("Supervisory Control and Data Acquisition") or MES ("Manufacturing Execution System") type or OPC ("OLE for Process Control") servers. Electrical equipment 112 may for example be programmable logic controllers, input/output modules, speed controllers, switches (circuit breakers, contactors), sensors, actuators or measurement apparatus such as electricity meters. The equipment 112, 114 forms the automation part of the system 100 and may for example be connected to the Internet network through one or several intranet networks 105 to which this equipment is connected.

Automation applications are installed on this equipment 112, 114 and are designed to exchange computer data with the software interface 110 of the database 106. Data are exchanged between the database 106 and equipment 112, 114 through the same web protocol as that used between client devices 102 and the database 106, in this case OData.

The use of the OData protocol enables equipment 112, 114, and also the software interface 110 to pass through computer firewalls protecting the intranet networks 105.

The database 106 will store data sent from the equipment 112, 114 to the database 106. These data fill in the database 106 with different values derived for example from the state of the logic controller of this equipment 112, 114. These data may for example be the electricity consumption of equipment 112, 114, state values of equipment 112, 114 or any other data about this equipment 112, 114. Such data transfers by equipment 112, 114 to the database 106 may be made when cyclic events occur and/or during state changes of the equipment 112, 114, so that the data stored in the database 106 can be regularly updated. These events are configured for example using planning tools in the equipment 112, 114.

At the same time as the data stored in the database 106 are updated by sending data from equipment 112, 114, client devices 102 communicate with the database 106 particularly to retrieve data stored in the database 106 and to display them by means of graphic interface components ("widgets") used as visual interfaces between client devices 102 and users of these client devices 102.

Since computer applications of client devices 102 do not know the data model of the queried base 106 in advance, defining for example the format (number of inputs) of tables of the base 106 in which the data are stored, or since the client devices 102 can view data stored in the different bases 106 containing different data models, or since the data model in the database 106 may change, the system 100 is designed to enable dynamic construction of appearances and behaviours of graphic interface components displayed by the client devices 102.

A client device 102 that wants to display data stored in the base 106 will firstly retrieve metadata from the required database 106, to make such a dynamic construction of interfaces. The computer application of the client device 102 firstly selects the database 106 using the URL address of this base 106 and sends a query to the database 106 (for example the "Get Metadata" request for the OData protocol, or by adding "$metadata" to the root URL of an OData service of the database) requesting it to send its metadata to it. Metadata is data used to define or describe other data, regardless of the medium on which it is stored. OData metadata describe the data model (structure and organisation of resources) exposed by OData service servers, in other words structures and organisations of tables of the database 106 in which data that the client device 102 is attempting to retrieve are stored. For example, the metadata are described using an XML language.

In response to this query sent by the client device 102, the database 106 sends its metadata to the client device 102. The client computer application then retrieves the list of items corresponding to the various inputs of the table (item "Metadata") from the received Metadata and associates one or several of these items with the corresponding graphic interface components. For example, the computer application on the client device 102 may associate the "electricity consumption" item with a curve type of graphic interface component, so that the values of electricity consumption can be displayed on the client device 102 in the form of a curve. Therefore the computer application of the client device 102 automatically associates a type of graphic interface component or widget, with a metadata.

For example, if the metadata sent to the client device 102 indicate that the data comprise a category indicating curve values stored in a table comprising 250 rows, the client application will for example associate data stored in the database 106 with a graphic interface component displaying the curve with the 250 values in the table.

The client device 102 then sends another request ("Get data") to the database 106 requesting the database 106 to send data stored in the tables of the database. The database 106 sends these data to the client device 102. These data are then processed by the computer application of the client device 102 to update the graphic interface components displayed by the client device 102.

Figure 2:
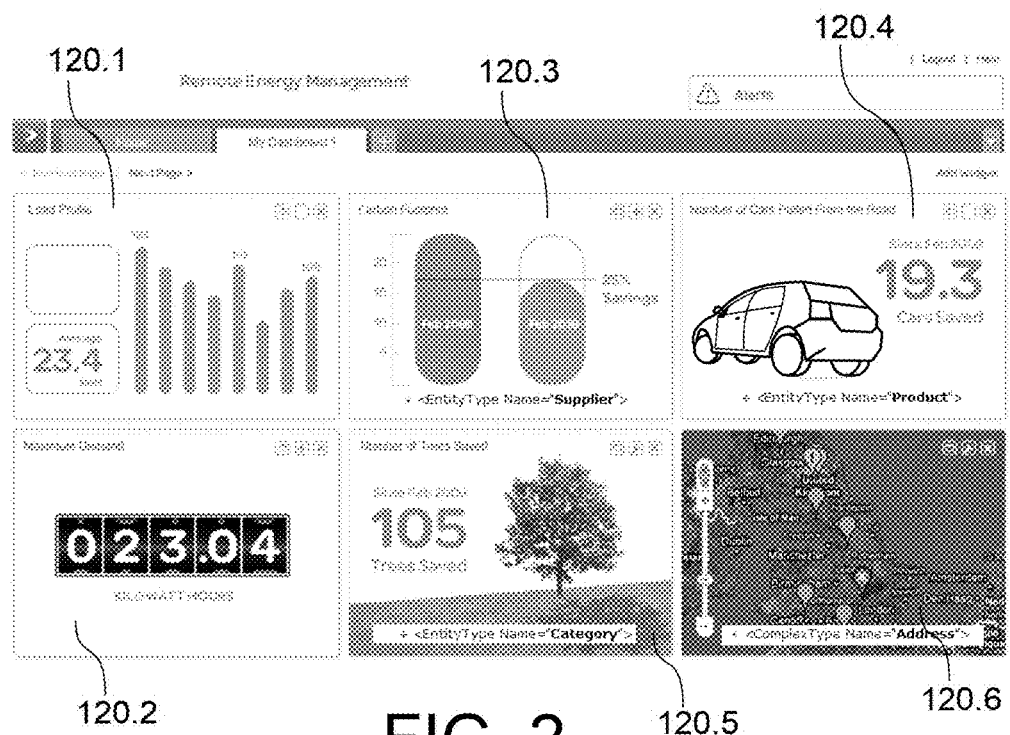
FIG. 2 shows examples of graphic interface components constructed dynamically from metadata sent from a database to a client computer device of a computer system, according to a particular embodiment of this invention.

FIG. 2 shows several examples 120.1-120.6 of graphic interface components displayed by the client device 102 representing data related to the energy consumption of one or several items of equipment 112, 114 in different forms: graphic, images, geographic data, meters, etc.

At the same time as graphic interface components are dynamically constructed, the system 100 also allows the user to modify, add or delete data stored in the database 106. For example, it will be useful to modify state values that will be retrieved by the equipment 112, 114, in the database, these state values controlling the operating mode of the equipment 112, 114. Thus, the user can control operation of the equipment 112, 114, for example after firstly viewing energy consumption data for the equipment 112, 114.

This is done by sending data from the client device 102 to the database 106 that stores these data. The equipment concerned can then retrieve these data by sending a request for sending data to the database 106 (for example, these requests may be sent regularly by the equipment 112, 114 to check whether or not the equipment operating mode should be changed), that in response returns the requested data to the equipment.

The invention claimed is:

1. A computer system for sharing data, the computer system comprising:
   a database configured to
      receive, via a software interface of the database, the data from at least one electrical equipment through a communication network, the software interface of the database and the at least one electrical equipment communicating with each other using Open Data Protocol, and
      store the data received from the at least one electrical equipment, the at least one electrical equipment being one of a programmable controller, an input/output module, a speed controller, a switch, a sensor, an actuator, and a measurement apparatus; and
   at least one client computer device configured to communicate with the software interface of the database through the communication network, wherein the at least one client computer device is configured to send, to the software interface of the database, a request to send metadata describing a data model of the database, wherein the software interface of the database is configured to send the metadata to the at least one client computer device, and wherein at least one client computer device is further configured to generate a software graphic interface based on the received metadata, by associating the received metadata with at least one graphic interface component that graphically displays at least part of the data that is stored in the database and received from the at least one electrical equipment,
   wherein the software interface of the database and the at least one client computer device are configured to send and receive data, based on the Open Data Protocol, and
   wherein at least part of the communication network is an Internet network.

2. The computer system according to claim 1, wherein the at least one client computer device is further configured to send and receive the data to be stored in the database.

3. The computer system according to claim 1, wherein the at least one client computer device is one of a computer, an electronic tablet, and a smartphone.

4. A method for sharing data to be stored in at least one database, including at least production of a software graphic interface in a client computer device configured to communicate with a software interface of the database through a communication network, the method comprising:
   transmitting the data from at least one electrical equipment to the software interface of the database through the communication network, the software interface of the database and the at least one electrical equipment communicating with each other using Open Data Protocol;
   storing the data sent from the at least one electrical equipment in the database, the at least one electrical equipment being one of a programmable logic controller, an input/output module, a speed controller, a switch, a sensor, an actuator, and a measurement apparatus;
   sending a request to send metadata describing a data model of the database, from the client computer device to the software interface of the database;
   sending the metadata from the software interface of the database to the client computer device, the software interface of the database and the client computer device communicating with each other using the Open Data Protocol; and
   generating by the client computer device, the software graphic interface based on the received metadata, by associating the metadata with at least one graphic interface component that graphically displays at least part of the data that is stored in the database and transmitted from the at least one electrical equipment.

5. The method according to claim 4, further comprising:
   sending a request to send at least part of the data stored in the database from the client computer device to the software interface of the database; then
   sending the data stored in the database, from the software interface of the database to the client computer device; and
   updating the graphic interface component using the data received by the client computer device.

6. The method according to claim 4, wherein the transmitting of the data from the at least one electrical equipment to the software interface of the database is performed during one of a regular time interval and during a state change of the at least one electrical equipment.

7. The method according to claim 4, further comprising:
   sending control data from the client computer device to the software interface of the database;
   storing the control data in the database;

sending a request to send control data stored in the database from the at least one electrical equipment to the software interface of the database; and sending control data stored in the database, from the software interface of the database to the at least one electrical equipment.

8. The computer system according to claim 1, wherein the at least one electrical equipment is controlled by the at least one client computer device via the generated software graphic interface.

9. The computer system according to claim 8, wherein the at least one client computer device controls the at least one electrical equipment by modifying via the generated software graphic interface, parameters of the at least one electrical equipment that determine an operating mode of the at least one electrical equipment.

10. The computer system according to claim 1, wherein the at least one client computer device corresponds to a smartphone, the at least one electrical equipment comprises an electricity meter, the data corresponds to state values controlling an operating mode of the at least one electrical equipment, and the smartphone controls the at least one electrical equipment by modifying via the generated software graphic interface, the state values controlling an operating mode of the at least one electrical equipment.

* * * * *